(12) United States Patent
Freeman

(10) Patent No.: US 7,777,960 B2
(45) Date of Patent: Aug. 17, 2010

(54) WIDE FIELD OF VIEW HEAD-UP DISPLAY SYSTEM

(75) Inventor: Mark O. Freeman, Snohomish, WA (US)

(73) Assignee: Microvision, Inc., Redmond, WA (US)

( * ) Notice: Subject to any disclaimer, the term of this patent is extended or adjusted under 35 U.S.C. 154(b) by 0 days.

(21) Appl. No.: 12/424,129

(22) Filed: Apr. 15, 2009

(65) Prior Publication Data

US 2009/0201589 A1   Aug. 13, 2009

Related U.S. Application Data

(63) Continuation-in-part of application No. 11/852,628, filed on Sep. 10, 2007, now Pat. No. 7,715,103, and a continuation-in-part of application No. 12/194,466, filed on Aug. 19, 2008, now Pat. No. 7,656,585.

(51) Int. Cl.
*G02B 27/10* (2006.01)
*G09G 5/00* (2006.01)
(52) U.S. Cl. ............................. 359/630; 359/636; 345/7
(58) Field of Classification Search ................. 359/630, 359/631, 634, 636, 13, 618–620, 626, 627; 345/7–9
See application file for complete search history.

(56) References Cited

U.S. PATENT DOCUMENTS

| 3,807,849 A | 4/1974 | Lobb |
|---|---|---|
| 4,634,220 A | 1/1987 | Hockert et al. |
| 5,625,493 A | 4/1997 | Matsumura et al. |
| 6,043,937 A | 3/2000 | Hudson et al. |
| 6,236,511 B1 | 5/2001 | Brown |
| RE38,245 E | 9/2003 | Morris et al. |
| 2004/0135742 A1 | 7/2004 | Weber et al. |
| 2004/0196438 A1 | 10/2004 | Togino |
| 2006/0098272 A1 | 5/2006 | Lerner et al. |
| 2006/0221022 A1 | 10/2006 | Hajjar |
| 2007/0103747 A1 | 5/2007 | Powell et al. |
| 2009/0059336 A1 | 3/2009 | Dunphy et al. |

FOREIGN PATENT DOCUMENTS

| EP | 0151703 | 8/1985 |
|---|---|---|
| EP | 0463888 | 1/1992 |
| WO | WO8903059 | 4/1989 |

*Primary Examiner*—Alicia M Harrington
(74) *Attorney, Agent, or Firm*—Kevin D. Wills

(57) ABSTRACT

A projection system, such as a system suitable for head-up displays in automobiles, includes a laser projection source (101) and a scanner (102). Light from the laser projection source (101) is scanned across a projection surface (104), which can be a car's windshield. The projection surface (104) includes a buried numerical aperture expander (105) capable of reflecting some light and transmitting other light. The system may also include an image projection source (551) capable of presenting high-resolution images on a sub-region (552) of the projection surface (604) that has a optical relay (650) disposed therein.

8 Claims, 8 Drawing Sheets

WIDE FIELD OF VIEW HEAD-UP DISPLAY SYSTEM

CROSS REFERENCE TO PRIOR APPLICATIONS

This application is a continuation-in-part of U.S. application Ser. No. 11/852,628, entitled "Buried Numerical Aperture Expander Having Transparent Properties," filed Sep. 10, 2007, which is incorporated by reference herein for all purposes.

This application is a continuation-in-part of U.S. application Ser. No. 12/194,466, entitled "Embedded Relay Lens for Head-Up Displays or the Like," filed Aug. 19, 2008, which is incorporated by reference for all purposes.

BACKGROUND

1. Technical Field

This invention relates generally to projection systems for providing head-up displays with which a user may both see information presented upon the display and see objects beyond the display, and more particularly to a laser-based head-up display having a wide field of view.

2. Background Art

Head-up displays are systems that present information to a user along a transparent screen so that the user need not move their eyes from their primary viewing position to read the information. Once only available in expensive systems such as military aircraft, head-up systems are now becoming commercially available to consumers as well.

Traditional head-up displays employ a projection source, such as a laser projector, to present images and information on a semi-transparent display surface, such as a windshield or cockpit bonnet. By projecting information onto a semi-transparent display surface, information can be communicated to a driver without the driver having to divert his eyes from his main point of focus—the road. Prior art projection sources generally use raster scanning techniques to superimpose lines of information to create a composite image.

One problem associated with prior-art head-up displays is that they have a limited "field of view." The field of view, sometimes called the field of vision, is the angular extent of the display that is observable at any given moment. Most prior art automotive head-up displays are constrained to very narrow projection angles and consequently have a narrow field of view. The projection angles of many prior art displays are on the order of six degrees by two to three degrees. Consequently, when projecting information on a windshield, the information can only be written on a small projection surface, such as a square that is only a few inches wide. Attempting to project on a larger surface dilutes the light available from the projection source, thereby rendering the information unintelligible.

There is thus a need for an improved head-up display system having a wider field of view.

Figure 1:
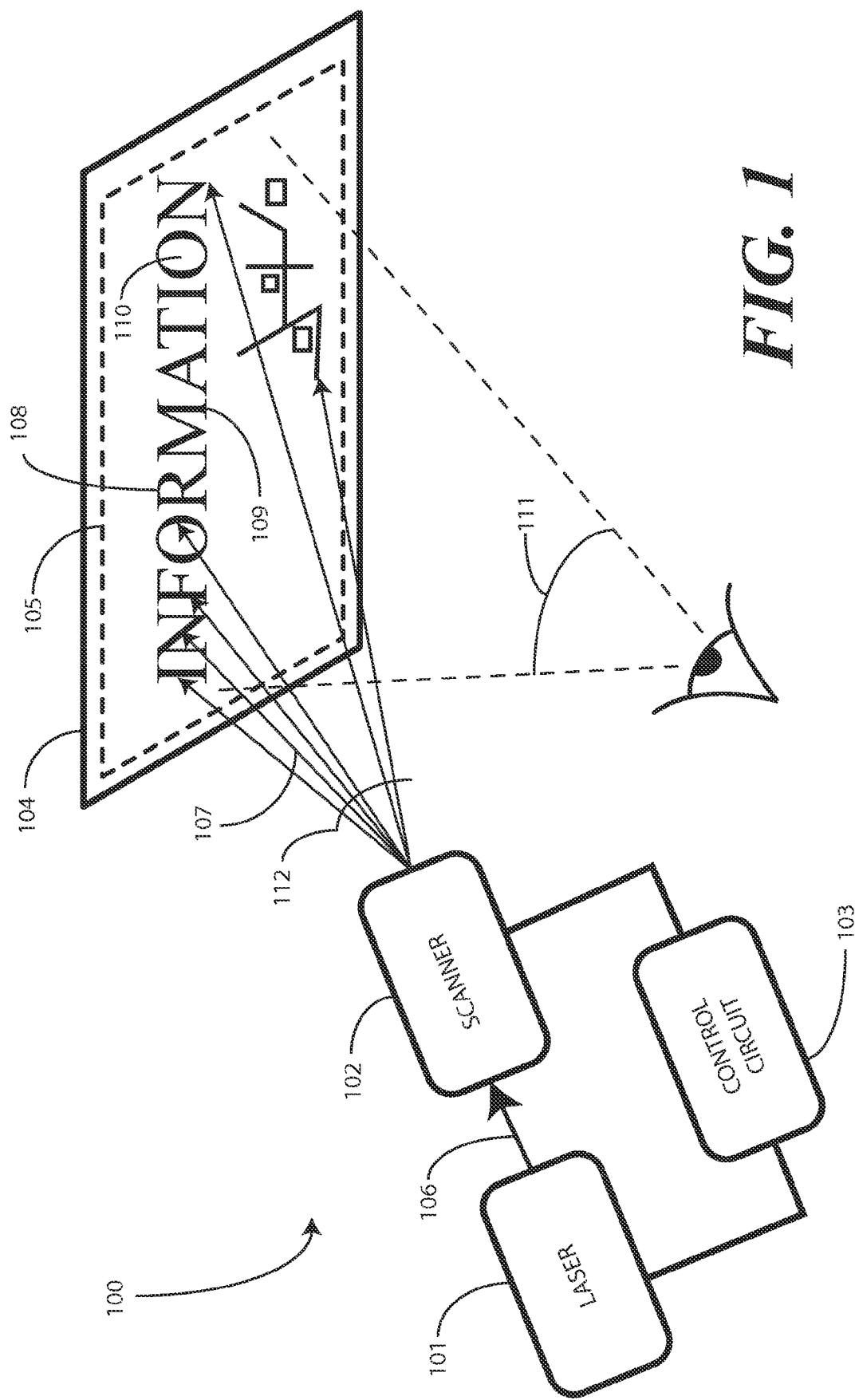
FIG. 1 illustrates one projection system in accordance with embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations apparatus components related to the provision of a head-up display with a wide field of view. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of controlling laser scanning devices, providing operating steps which components of the system execute, and so forth, as described herein. Instructions for such control circuits can be stored in a computer-readable medium, such as a memory coupled to the control circuit or embedded therein. As such, functions of the control circuit may be interpreted as steps of a method to perform generation of images for a head-up display. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

In this document, relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide a projection system suitable for a head-up display having a wide field of view. For example, while prior art head-up display systems may have a typical projection angle of six degrees by three degrees, embodiments of the present invention provide projection angle capability that can extend to the order of one hundred degrees by one hundred degrees or more. As such, embodiments of the present invention are suitable for automotive applications, as the system can provide highly visible, vibrantly colored images across large portions or entireties of an automotive windshield without a dilution of display brightness due to the improved efficiency of the system.

In one embodiment, a laser projection source, which can be a single laser, multiple lasers, or a single, multi-colored laser, delivers light to a light scanner. The light scanner, which in one embodiment is a two-axis vector scanner, directs light to a projection surface. The projection surface includes a buried numerical aperture (NA) expander that is at least partially transparent so as to reflect the light from the laser projection source while allowing a viewer to see through the projection surface.

In one embodiment, the projection surface is the windshield of an automobile. The buried numerical aperture expander can be coupled to the windshield or embedded therein. When used in an automotive application, the light scanner and laser projection source can be integrated into the dash board or ceiling so that neither the driver nor passengers interfere with the light that is creating the image on the windshield. Embodiments of the present invention are well suited to such applications, as the wide projection angles allow the system to address the entirety of the windshield with information.

A control circuit controls the light scanner so that, in one embodiment, light is directed to locations where information is to be written. Said differently, rather than repeatedly scanning the entire projection surface as a raster-type scanner would, the control circuit causes the light scanner to project light only where information is presented, thereby increasing the overall luminous efficiency of the system. As the light from the laser projection source is spread across only the portions of the display where information is presented, the information is brighter and clearer than with raster-scanned systems. Where multiple lasers or a multicolor laser is used as the laser projection source, the control circuit is configured to modulate the beam via the light scanner at an appropriate pixel rate to present a brilliantly colored, bright display.

Embodiments of the present invention employ laser projection sources that project light in the visible spectrum. The aperture expander allows such light to be reflected from a partially transparent surface while allowing a viewer to also view through the projection surface. Note that some prior art attempts to provide wide angle head-up displays, such as that set forth in US Published Patent Application No. 2006/0221022 to Hajjar, have used ultra-violet laser sources with photoluminescent materials embedded within a projection screen.

Embodiments of the present invention offer numerous advantages over such ultra-violet systems. First, visible light is often preferred for use in human interface systems over ultra-violet solutions for health reasons. Second, a full, vivid color spectrum is very difficult to achieve with three ultra-violet lasers and photoluminescent materials, as the photoluminescent materials are generally selective with respect to which colors, i.e., wavelengths, they absorb and emit. Most photoluminescent materials absorb light within a given absorption spectrum and emit light of a given color in a narrow spectrum determined by the molecular structure or particle shape of the photoluminescent material. To achieve a full-color display, a major challenge is to find three invisible lasers (UV or IR) that produce light at three distinct wavelengths and three corresponding photoluminescent materials such that each laser is absorbed by only one of the photoluminescent materials and that the three materials emit visible light at red, green and blue wavelengths respectively. Due to practical limitations on the available photoluminescent materials, the colors in such displays appear weak and washed out.

Turning now to FIG. 1, illustrated therein is one embodiment of a system 100 for providing a head-up display in accordance with embodiments of the invention. The system 100 includes a laser projection source 101, a scanner 102, a control circuit 103, and a projection surface 104. In the illustrative embodiment of FIG. 1, the projection surface 104 comprises a buried numerical aperture expander 105, which may be attached or affixed to or embedded within the projection surface 104.

The laser projection source 101 can be a simple monocolor laser. Alternatively, the laser projection source 101 can comprise multiple lasers or a multicolor laser. For example, the laser projection source 101 can include a red laser, a blue laser, and a green laser. These lasers can be of various types. For example, for compact designs, semiconductor-based lasers can be used, including edge emitting lasers or vertical cavity surface emitting lasers. In other applications, larger, more powerful lasers can be used, alone or in combination.

Where multiple lasers are used as the laser projection source 101, one or more optical alignment devices (not shown in FIG. 1) may be used to orient the plurality of light beams into a single combined light beam. The alignment devices can further blend the output of each laser to form a coherent, multicolored beam of light. In one embodiment, dichroic mirrors can be used to orient the light beams into the combined light beam. Dichroic mirrors are partially reflective mirrors that include dichroic filters that selectively pass light in a narrow bandwidth while reflecting others.

Regardless of what type of laser projection source 101 is used, the laser projection source 101 delivers light 106 to the scanner 102. In one embodiment, the scanner comprises a two-axis vector laser scanner capable of scanning the light across a projection surface. Such scanners are well known in the art and are available from a variety of suppliers. These scanners are used, for example, in laser-light shows where laser projection sources are scanned across buildings or large projection surfaces to form an image.

The scanner 102 is configured to receive the light 106 from the laser projection source 101 and deliver scanned light 107 to the projection surface 104 as a projected image 108. A control circuit 103, which may be a microprocessor or other programmable device, executes embedded instructions to control the scanner 102. For example, in one embodiment the control circuit 103 is programmed to control the scanning of the light 106 received from the laser projection source 101 to form the projected image 108.

In one embodiment, the control circuit 103 is configured to increase the optical efficiency of system 100 by selectively scanning information of the projected image 108. It is often the case that the projected image 108 will include informational portions 109 and non-informational portions 110. For example, in the illustrative embodiment of FIG. 1, the projected image 108 is the word "INFORMATION." The regions forming the letters in that word comprise the informational portions 109 of the projected image 108. Other regions, such as the space inside the "O" in information, in one embodiment, are not addressed by the scanner 102. Said differently, the control circuit 103 in one embodiment is configured to cause the scanner 102 to scan the light 106 received from the laser projection source along the informational portions 109 without scanning the non-informational portions 110. While a raster-scanned system would scan the entire projection surface, embodiments of the present invention scan only the informational portions 109, thereby increasing efficiency.

By using a scanner 102 to direct the light 106 as scanned light 107 to the projection surface, and by directing scanned light 107 only to the informational regions, exceptionally wide scan angles 112, and correspondingly wide fields of view 111, are possible with embodiments of the present invention. For example, due to the increased optical efficiency, the scanner 102 is capable of creating projected images 108 having a scan angle 112 of ten, twenty, fifty, one hundred, or more degrees by ten, twenty, fifty, one hundred, or more degrees. This can be accomplished without significant degradation of color or light intensity.

The system 100 of FIG. 1 is well suited for automotive applications. For example, the laser projection source 101 can be embedded in the dashboard or coupled to the roof of a vehicle. The buried numerical aperture expander 105 can then be integrated into the windshield, thereby employing the windshield as the projection surface 104. Due to its wide scan angle 112, the laser projection source 101 and scanner 102 can be embedded in the dashboard while still being able to address the entire windshield. As such, the driver has a field of view 111 that is twenty, thirty, forty, fifty, or more degrees by twenty, thirty, forty, fifty, or more degrees. Further, the projected image can be kept bright while keeping the power drawn by the laser projection source 101 low by virtue of the increased efficiency. This reduction in power means less heat generated by the laser and less power drawn from the automobile's electrical system.

Figure 2:
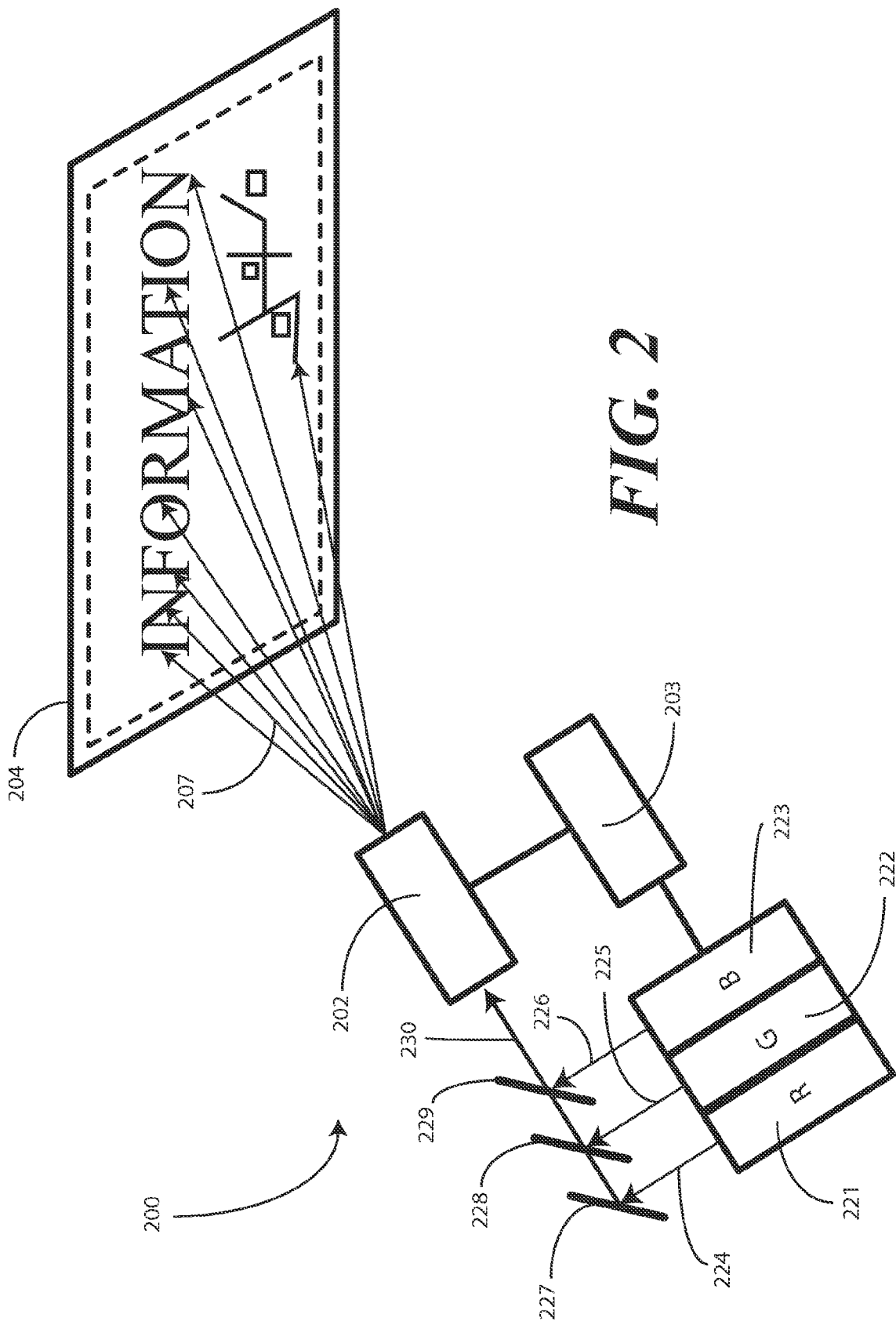
FIG. 2 illustrates another projection system in accordance with embodiments of the invention.

Turning now to FIG. 2, illustrated therein is a multi-laser system 200 in accordance with embodiments of the invention. As mentioned above, the laser projection source (101) can be a single laser or a plurality of lasers. Further, the laser projection source (101) can be monocolor or multi-color. In some embodiments, such as those designed to reduce speckle or increase brightness, multiple lasers of a single color may be employed. In other embodiments, a plurality of multi-color lasers will be employed. In the illustrative embodiment of FIG. 2, the laser projection source 201 comprises a plurality of lasers 221,222,223.

The plurality of lasers 221,222,223 produces a plurality of light beams 224,225,226. In one embodiment, the plurality of lasers 221,222,223 includes a red laser 221, a blue laser 222, and a green laser 223.

In the illustrative embodiment of FIG. 2 optical alignment devices 227,228,229 are then used to orient the plurality of light beams 224,225,226 into a combined light beam 230. Such a configuration permits a single, simple scanner 202 to be used. Note that multiple scanners can be used to deliver scanned light 207 to the projection surface 204 as well. Further, sophisticated scanners can be used to direct the plurality of light beams 224,225,226 as scanned light 207 to the projection surface 204. The embodiment of FIG. 2 is meant to be illustrative only, and is not meant to be limiting, as it will be clear to those of ordinary skill in the art having the benefit of this disclosure that any number of configurations of laser projection sources and scanners can be used with the projection surfaces and optical relays of the present invention.

In the illustrative embodiment of FIG. 2, dichroic mirrors are used as the optical alignment devices 227,228,229. The scanner 202, responsive to the control circuit 203, then produces the projected images on the projection surface 204 by modulating the combined light beam 230 (or alternatively the multiple light beams as the case may be) and delivering it as scanned light 207 to the projection surface.

Figure 3:
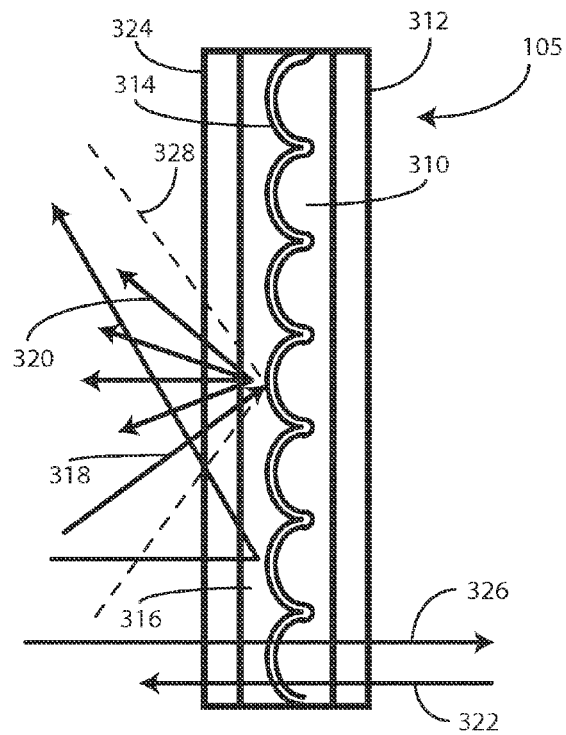
FIG. 3 illustrates one embodiment of an aperture expander in accordance with embodiments of the invention.
Figure 4:
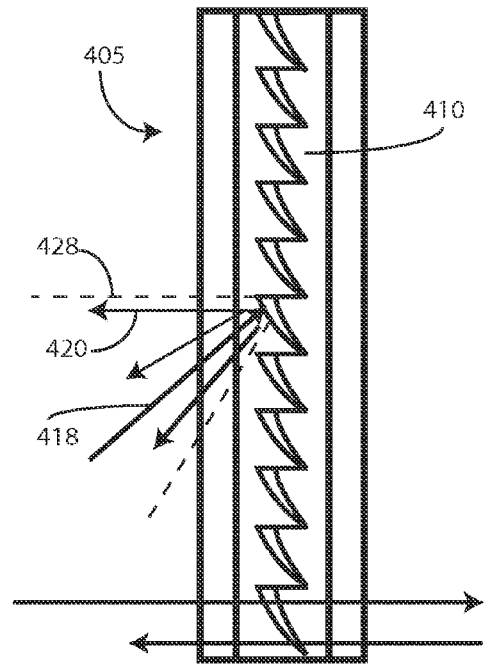
FIG. 4 illustrates another embodiment of an aperture expander in accordance with embodiments of the invention.

As set forth above, in one embodiment the projection surface comprises a buried numerical aperture expander (105). Turning now to FIGS. 3 and 4, illustrated therein are embodiments of buried numerical aperture expanders in accordance with embodiments of the invention. Turning first to FIG. 3, illustrated therein is one embodiment of a buried numerical aperture expander 105 suitable for use with embodiments of the invention. In one embodiment, the buried numerical aperture expander 105 includes an exit pupil expander as will be described.

In one embodiment, the buried numerical aperture expander 105 can be constructed to reflect certain incident light rays 318. The resulting reflected light rays 320 may be expanded to a desired output expansion cone 328 to provide a larger field of view of a reflected image to a viewer. This expansion of reflected light rays 320 may also be referred to as "numerical aperture" expansion.

The buried numerical aperture expander 105 can also be constructed to allow certain light rays 322 and 326 to be transmitted, at least in part. Such light rays 322,326 therefore travel through either side of the buried numerical aperture expander 105. As such, the buried numerical aperture expander 105 can be constructed to have both reflective and transmissive properties. This works well in automotive applications, such as windshields, where it is desirable to display an image from the image projection source on the buried numerical aperture expander 105 while still allowing the buried numerical aperture expander 105 to be at least partially transparent to allow a user to see through the buried numerical aperture expander 105 while simultaneously viewing the displayed image.

In one embodiment, the buried numerical aperture expander 105 includes a first layer 312 that is light transmissive. The first layer 312 can be glass, plastic, Mylar, or another similar material and can be rigid or be flexible. Flexibility allows the buried numerical aperture expander 105 to be curved or manipulated to a desired shape or curvature.

An exit pupil expander 310, which may be either an ordered array of microstructures or a randomized light diffuser, is disposed adjacent to first layer 312. The exit pupil expander 310 can be, for example, a micro lens array (MLA). The exit pupil expander 310 can be manufactured from a molded liquid polymer, or may be formed via other methods. In one embodiment the exit pupil expander 310 may be embossed on first layer 312 by a roll embossing process. In another embodiment, the exit pupil expander 310 may comprise glass or plastic beads, or microspheres or nanospheres, or similarly shaped objects capable of functioning as an optical diffuser or lens.

The exit pupil expander 310 may have optical properties resulting from a selected pitch, radius, or spacing of its constituent parts to expand incident light that is reflected. Further, the exit pupil expander 310 may include various holographic elements, a diffractive grating, or other optical elements capable of optically expanding reflected light rays 320 to result in a controlled angle of reflection or interference pattern.

In one embodiment, a reflective layer 314 may be disposed on the exit pupil expander 310 to impart reflective properties. The reflective layer 314 may comprise a thin coating of aluminum or other suitable metal having reflective properties at a desired wavelength, and may have a thickness of about 50 angstroms to allow some light to be reflected and to also allow some light to be transmitted. The reflective layer 314 can also be manufactured from a thin film or laminated stack of dielectric materials, or a combination of dielectric materials and metals. In such an arrangement, reflective layer 314 may be a broadband partial reflector. For example, approximately 30% of incident light from light ray 318 may be reflected by reflective layer 314 as light rays 320, and approximately 70% of incident light from light ray 318 may be transmitted through reflective layer 314 without being reflected.

In one embodiment, the reflective layer 314 may comprise a polarization dependent reflector in which incident light from light ray 318 having a first polarity is reflected as expanded light rays 320, and incident light from light ray 118 having a second polarity is transmitted. The reflective layer 314 can comprise one or more color selective filters in which incident light from light ray 318 having a first wavelength is reflected as expanded light rays 320, and incident light from light ray 318 having a second wavelength is transmitted through reflective layer 314.

Further, the reflective layer 314 may comprise a first polarization material in a first region of exit pupil expander 310 to reflect light having a first polarity in the first region, and may comprise a second polarization material in a second region of exit pupil expander 310 to reflect light having a second polarity in the second region, to result in dual or multiple displays. Similarly, multiple reflection selectivity may be provided using one or more color filters for the reflective layer 314. Thus, the reflective layer 314 may comprise one or more broadband reflectors, polarized coatings, and/or narrowband coatings, or combinations thereof.

Construction of the buried numerical aperture expander 105 may be completed by affixing the second layer 324 to the exit pupil expander 310 via an epoxy 316 or other adhesive or filler material. The second layer 324 can be constructed in similar fashion. In one embodiment, the first layer 312 and the second layer 324, the exit pupil expander 310, and the epoxy 316 are materials having the same, or nearly the same, index of refraction. This configuration permits transmissive light rays 322 to pass through buried numerical aperture expander 105 without being significantly affected or distorted. Further the angle at which light rays 322 leave the buried numerical aperture expander 105 is the same, or nearly the same, as the angle at which they enter. Such properties of the buried numerical aperture expander 105 permit reflection of some light with expansion, and transmission of other light without expansion.

Turning now to FIG. 4, illustrated therein is a cross sectional view of an alternate embodiment of a buried numerical aperture expander having an asymmetrical exit pupil expander suitable for use with embodiments of the invention. The buried numerical aperture expander 405 as shown in FIG. 4 is substantially similar to the buried numerical aperture expander (105) shown in FIG. 3, with a few differences. The exit pupil expander 410 of FIG. 4 is designed to have an asymmetrical structure so that reflected light rays 420 are directed to a desired direction according to the symmetry imparted to the structures of the exit pupil expander 410. For example, the exit pupil expander 410 may have an asymmetrical structure to cause reflected light rays 420 to have a directional bias from the angle of reflection that would otherwise occur if exit pupil expander 410 were symmetrical.

In the exemplary embodiment of FIG. 4, the exit pupil expander 410 has an asymmetry to bias reflected light rays 420 downward, which results in the output expansion cone 428 to also be directed downward. Alternatively, the exit pupil expander 410 may have an asymmetry to bias reflected light rays 420 upward which would result in the output expansion cone 428 to be directed upward as well. Such an asymmetrical structure of the exit pupil expander 410 may be utilized to direct the output expansion cone 428 to a desired location according to the particular application. For example, in an automotive head-up display application, the asymmetrical buried numerical aperture expander 405 may be disposed on or within a windshield, which may be positioned at an angle with respect to the viewer. Thus, the exit pupil expander 410 may be designed to have an appropriate asymmetry to direct the output expansion cone 428 to the eye of the driver so that the driver may view images projected by a display along light ray 418. In general, the asymmetry of the exit pupil expander 410 may be selected in combination with the placement of the display and angle of incidence of light rays 418 emitted from the display, the placement and angle of buried numerical aperture expander 405, and the position of the viewer of the displayed images.

The "asymmetricalness" of the elements of the exit pupil expander 410 may vary from element to element of the exit pupil expander 410. For example, the asymmetry of the elements located toward the ends of the exit pupil expander 410 may have more asymmetry than elements located toward the center of the exit pupil expander 410. Additionally, centrally located elements may have very little or no asymmetry. Such varying asymmetry directed toward the center of the exit pupil expander 410 may be utilized to result in a smaller, narrower output expansion cone 428. Varying asymmetry directed away from the center of the exit pupil expander 410 may result in a larger, wider output expansion cone 428.

Figure 5:
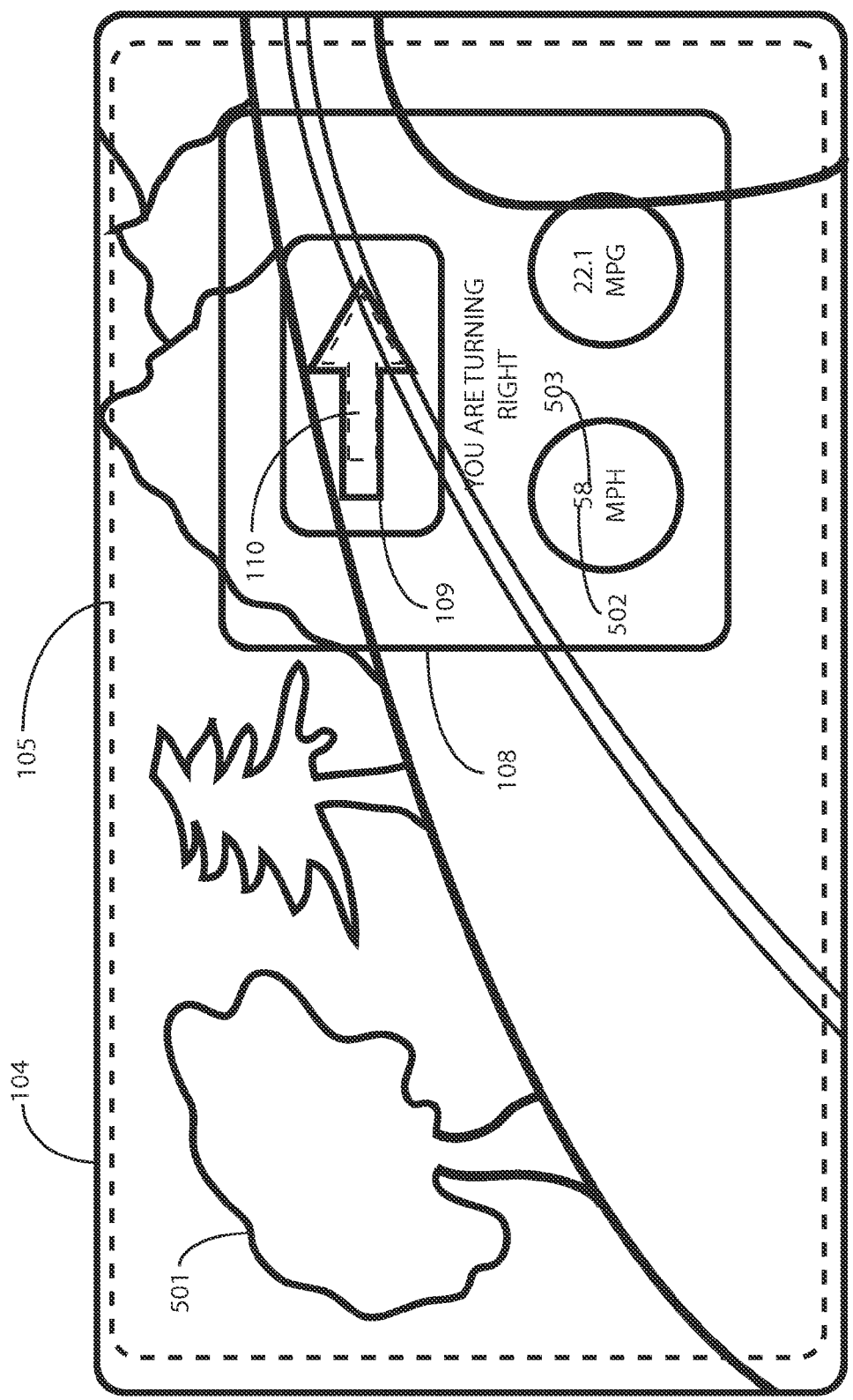
FIG. 5 illustrates an exemplary head-up display in accordance with embodiments of the invention.

Referring now to FIG. 5, illustrated therein is a side elevation view of a projection surface 104 incorporating a buried numerical aperture expander 105 and having a projected image 108 presented thereon. This projected image 108 is but one example of an image that may be formed with a scanner (102) receiving light from a laser projection source (101) and delivering—in response to the control circuit (103)—scanned light (107) to the projection surface. In the illustrative embodiment of FIG. 5, the projection surface 104 has been configured as the windshield of a vehicle in motion. Alternatively, the buried numerical aperture expander 105 may cooperate with the windshield, rather than being embedded therein, for example as an after market system.

In the illustrative embodiment of FIG. 5, the buried numerical aperture expander 105 is transparent, or at least partially transparent. The projected image 108 is a reflection of visible light generated by the laser projection source (101) and scanned to the buried numerical aperture expander 105 by the scanner (102). In one embodiment, the projected image 108 appears to the viewer to be in the plane of the windshield or projection surface 104. Note that as this term used, the "plane of the projection surface" can be flat or non-flat, and is defined by the geometric shape of the projection surface 108. When the image appears in the "plane of the projection surface," it would appear closer than would an object 501 being viewed beyond the projection surface 104.

As shown in FIG. 5, the projected image 108 includes informational portions 109 and non-informational portions 110. The informational portions 109 are shown in FIG. 5 as black lines, while the non-informational portions 110 are shown as white space. In one embodiment, to increase efficiency, the control circuit (103) is configured to direct the scanner (102) to scan the light received from the laser projection source (101) along the informational portions 109 without scanning the non-informational portions 110.

Note that there will be some necessary scanning of the non-informational portions 110 when the scanner (102) sweeps from one informational portion 109 to the next. For example, when the scanner (102) sweeps from a first informational portion 502 to a second informational portion 503, a small part of a non-informational portion 110 will be swept. However, this sweeping is minimal. When the term "without scanning the non-informational portion" is used, this means that the scanning is predominantly directed only to informational portions 109 and does not continually sweep the entire projection surface as raster-scanned systems do.

Figure 6:
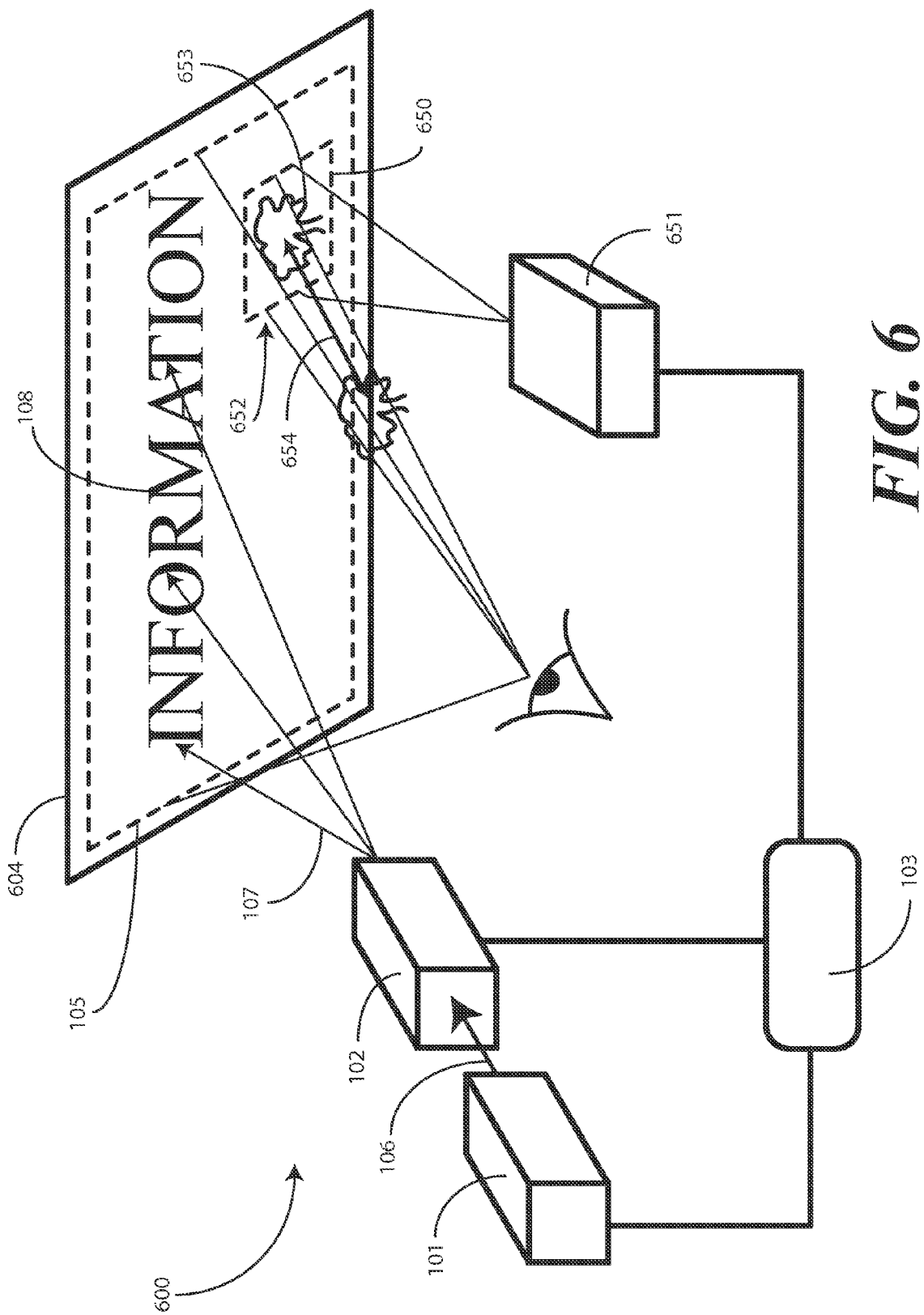
FIG. 6 illustrates one embodiment of a projection system in accordance with embodiments of the invention.

Turning now to FIG. 6, illustrated therein is another embodiment of a system 600 for providing a head-up display in accordance with embodiments of the invention. In the embodiment of FIG. 6, the projection surface 604 includes not only a buried numerical aperture expander 105, but an optical relay 650 as well. In one embodiment, the optical relay 650 is disposed along a sub-region 652 of the projection surface 604. In such an embodiment, the optical relay 650 will be smaller than the buried numerical aperture expander 105 in area. The viewer can see a projected image 108 in the buried numerical aperture expander 105 and a second projected image 653 in the optical relay 650. An expanded field of view is afforded by the wide scan angle of the scanner 102, while a narrower field of view is provided by the optical relay 650, as it is smaller in size.

A scanner 102, at the direction of a control circuit 103, directs light 106 from a laser projection source 101 as scanned light 107 to the projection surface 604 for reflection from the buried numerical aperture expander 105. In one embodiment, the resulting projected image 108 appears to the viewer to occur in the plane of the projection surface 604.

An image projection source 651, which may have an integrated control circuit, be at the direction of the control circuit 103, or be responsive another control circuit, is configured to project a second projected image 653 along the sub-region 652 of the projection surface 604 for reflection from the optical relay 650. As will be described in more detail below, in one embodiment, the optical relay 650 is configured such that the resulting second projected image 653 appears to a viewer to be in front of 654 the plane defined by the projection surface 604.

In one embodiment, where two projection sources are used, they can be configured so as not to substantially overlap. For example, the control circuit 103 can be configured to direct the scanner to scan received light 106 and form projected images 108 in areas other than the sub-region 652 of the projection surface 604. Similarly, the image projection source 651 can be configured to deliver the second projected image 653 only within the sub-region 652 of the projection surface 604. Alternatively, the buried numerical aperture expander 105 and optical relay 650 can be disposed in non-overlapping regions of the projection surface 604 as well.

In one embodiment, the comparable resolutions of the projection sources can be different. For example, to accommodate a wide scan angle and corresponding wide field of view, one projection source is the laser-projection source 101 guided by the scanner 102. This projection source has a lower resolution and is suitable for presenting information such as words, simple drawings, and other similar information. The benefit of a lower-resolution source is that the entire projection surface 604 can be addressed and written by the scanner 102.

As the sub-region 652 of the projection surface 604 is small, there is not the need for the wide scan angle or wide field of view. As such, a more sophisticated projection source can be used. For example, the image projection source 651 can be any of light emitting diode light sources, liquid crystal display light sources, processing light sources, digital light processing light sources illuminated by lasers, or Microelectromechanical System (MEMS) laser scanned light sources. Further, as the wide scan angle and increased efficiency is not required within the sub-region 652 of the projection surface 604, raster-scanning projection sources can be used as the image projection source 651 as well.

Figure 7:
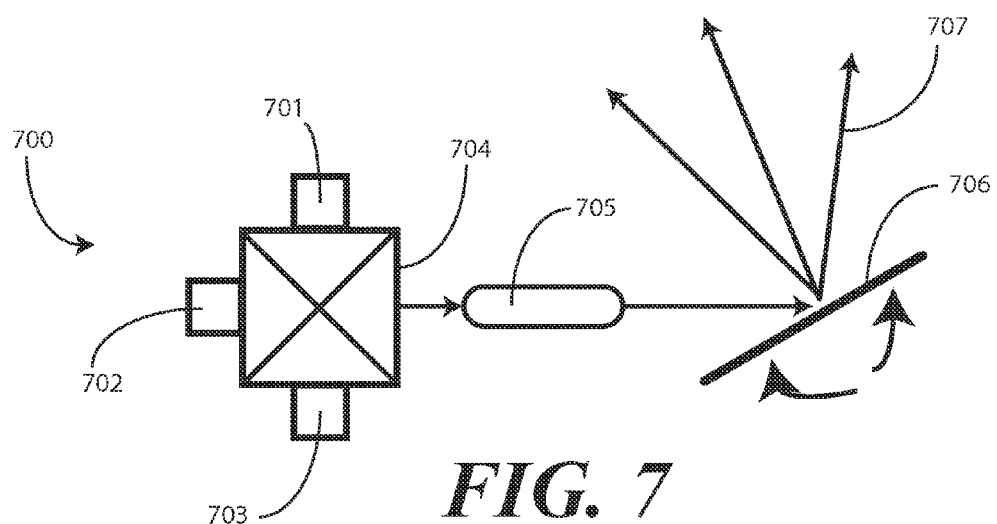
FIG. 7 illustrates one embodiment of MEMS projection source in accordance with embodiments of the invention.

Turning now to FIG. 7, illustrated therein is one embodiment of a projection source suitable for use as the image projection source (651) of FIG. 6. Specifically, illustrated in FIG. 7 is a MEMS scanned laser source 700. Examples of MEMS scanning light sources, such as those suitable for use with embodiments of the present invention, are set forth in U.S. patent application Ser. No. 11/786,423, filed Apr. 10, 2007, entitled, "Integrated Photonics Module and Devices Using Integrated Photonics Module," which is incorporated by reference herein.

In FIG. 7, the MEMS scanned light source 700 employs three light sources 701,702,702. A beam combiner 704 combines the output of light sources 701,702,703 to produce a combined modulated beam. A variable collimation or variable focusing optical element 705 produces a variably shaped beam that is scanned by the MEMS scanning mirror 706 as variably shaped scanned light beam 707. Examples of MEMS scanning mirrors, such as those suitable for use with embodiments of the present invention, are set forth in commonly assigned, copending U.S. patent application Ser. No. 10/984,327, filed Nov. 9, 2004, entitled "MEMS Device Having Simplified Drive," which is incorporated herein by reference, and in U.S. patent application Ser. No. 11/786,423, referenced above. The scanned light beam 807 can then be directed to the buried numerical aperture expander (105).

Figure 8:
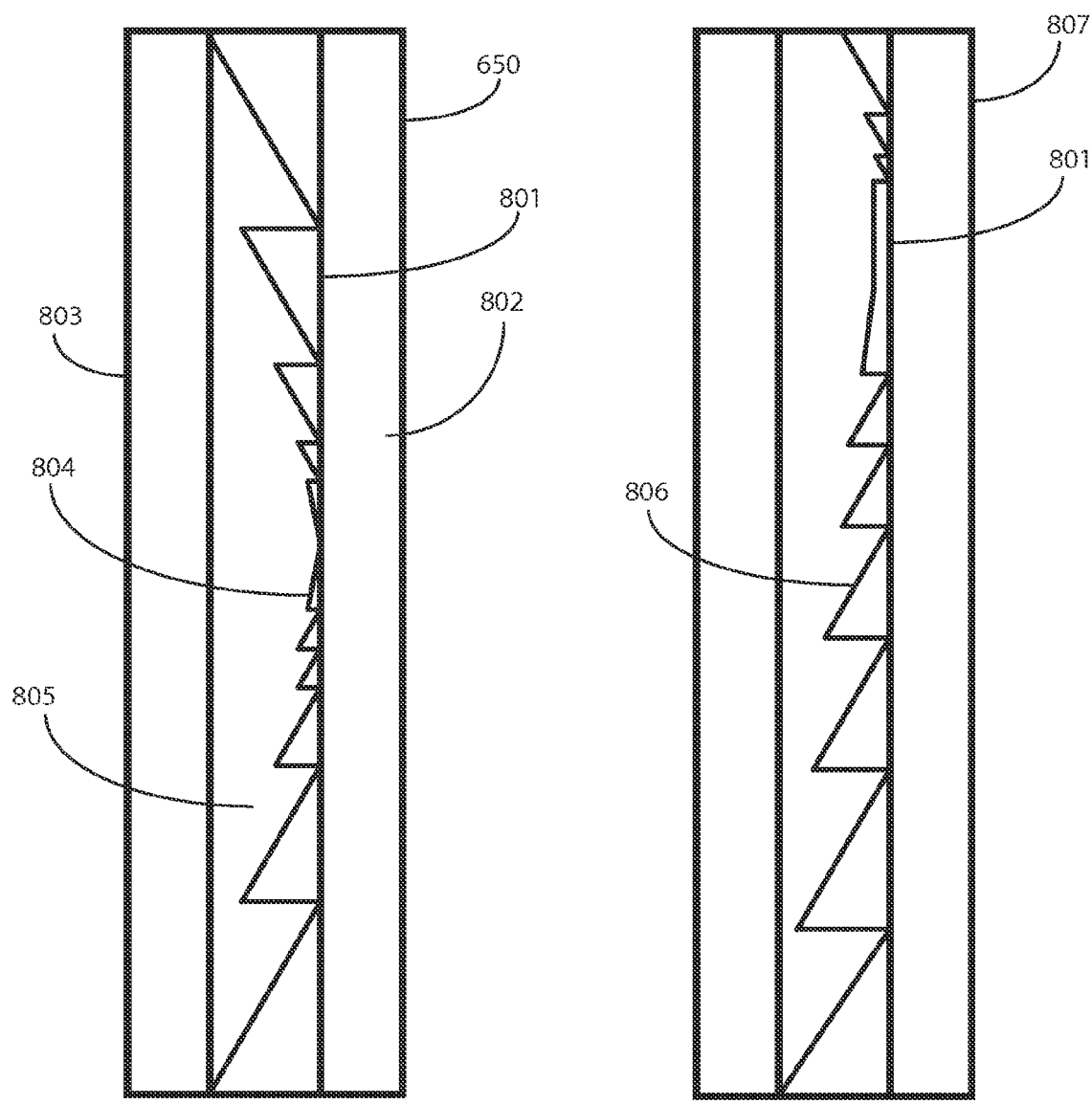
FIG. 8 illustrates embodiments of an optical relay suitable for use with projection systems in accordance with embodiments of the invention.

Turning now to FIG. 8, one such optical relay will be shown and described. As shown in FIG. 8, the optical relay 650 can comprise a Fresnel or diffractive lens 801 that is disposed between a first layer 802 and a second layer 803. While some embodiments employ a Fresnel lens, it will be clear to those of ordinary skill in the art having the benefit of this disclosure that the invention is not so limited. The Fresnel lens described in one embodiment may be interchanged with a diffractive lens in another embodiment. As such, and the scope of the claimed subject matter is not limited in this respect. Further, the Fresnel lens may comprise a diffractive lens, and so forth.

The first layer 802 and second layer 803 may be manufactured from a variety of materials. The materials may be selected depending upon the application. Further the material of the first layer 802 may be the same as, or different from, the material of the second layer 803. For example, one or both of the first layer 802 and the second layer 803 can be manufactured from glass or plastic, or from other type of substantially transparent material. Additionally, flexible materials may be used. Exemplary materials include glass, tempered glass, polyvinyl butyral (PVB) resin, and so forth.

Similarly, the Fresnel or diffractive lens 801 may be manufactured from glass or plastic that is sandwiched between first layer 802 and second layer 803. In one embodiment the Fresnel or diffractive lens may be embossed on first layer 802 by a roll embossing process. Alternatively Fresnel lens or diffractive lens 801 may be formed on a surface of first layer 802 and/or second layer 803. Since such a lens can comprise multiple surfaces 804, the optical relay 650 may include a filler medium 805. Examples of suitable filler media include optical cement or epoxy or other suitable filler medium that is at least partially see-through and/or at least partially optically transparent.

The Fresnel or diffractive lens 801, first layer 802, second layer 803, and/or filler medium 805 can be cured by application of ultraviolet light or by thermal curing. In one embodiment, the surface 806 can be at least partially reflective and at least partially transparent. By way of example, an at least partially reflective coating can be disposed on surface 806. This coating can be wavelength selective, where light having a first wavelength is reflected and light having a second wavelength passes through the coating. Further, the coating can be polarizing, where light having a first polarization is reflected or retarded and light having a second polarization passes through the coating.

The filler medium 805 can have a first index of refraction n1 and Fresnel or diffractive lens 301 can have a second index of refraction n2. When in use with an image projection source (651), diffractive artifacts may be reduced, minimized, or eliminated by designing one or more of the sections of Fresnel or diffractive lens 801 to have a width on the order of the beamlet size. Alternatively, the width can be of a diffraction order spacing within the diffraction envelope, projected at the relay lens plane, from each exit cone emanating from each pixel of the display's exit pupil expander (EPE), or equivalently, any image plane internal to the projector, in the display projector for which optical relay is utilized.

As noted above, the optical relay 650 can be adhered to, or embedded in, the projection surface (604). As also noted above, one suitable application for the optical relay 650 is in an automotive application where the windshield of the vehicle serves as the projection surface (604). As such, the shape of optical relay 650 may be adapted to the shape of the projection surface. For example, the optical relay 650 may be relatively flat, or alternatively may have at least a slight curve on one or more surfaces. This curvature can be spherical or aspherical, with the Fresnel or diffractive lens 801 having a spherical or aspherical curvature.

The optical relay 650 may be a relatively thin and optically transparent device, which would be suitable for use with an automotive windshield. However, it will be clear to those of ordinary skill in the art having the benefit of this disclosure that the invention is not so limited. Alternative embodiments of the optical relay 807 may include an off-axis section of a Fresnel or diffractive lens which may be a slightly thicker but still moderately thin and see-through device. Additionally, the optical relay 650 may be a stand-alone device that is added for example in front of or behind a windshield or windscreen of a vehicle or of a helmet or other head-worn device, or alternatively, optical relay 650 may be disposed within or otherwise formed as part of or integral with such a windshield or windscreen, and the scope of the claimed subject matter is not limited in these respects.

In one embodiment, the optical relay 650 comprises a reflective Fresnel or diffractive lens 801 having a surface 806 disposed between two refractive index media having a first index of refraction n1 and a second index of refraction n2, such that the ratio between n1 and n2 is selected to implement a reflective or powered optical element. The reflective indices may be equal or substantially similar, or they may be different. For example, an optical relay 650 having substantially parallel outer surfaces of first layer 802 and second layer 803, and having equal or nearly equal indices n1 and n2 allows such an optical relay 650 to be see-through with no magnification of images seen through the optical relay 650. By contrast, providing different indices n1 and n2 disposed on opposed sides of the Fresnel or diffractive lens 801 can serve to affect magnification of a see-through image while still maintaining the power of the Fresnel or diffractive lens 801.

Where the first layer 802 and second layer 803 have curvature, they can be tailored to provide optical power. Such an arrangement may provide one or more additional degrees of freedom in the design and usage of optical relay 650. Further, in one or more embodiments it is also possible to actually have the inner surfaces of first layer 802 and second layer 803 to be curved in addition to the curvature of the outer surfaces of first layer 802 and second layer 803. This allows reasonably low see-through distortion while adding even more design degrees-of-freedom in the optical correction capability.

The Fresnel or diffractive lens 801 can be manufactured to be relatively thin and imaged in a tilted on-axis or normal-to-viewer off-axis case. In one embodiment, the Fresnel or diffractive lens 801 can also include a diffractive lens or holographic lens. A reflective coating may be disposed on a surface 806 of the Fresnel or diffractive lens 801 and may comprise a neutral density or a wavelength-selective notch filter such as a multi-notch Rugate coating, or other band-pass filter, or types of filters such as a high-pass filter or a low-pass filter suitable for use in monochrome systems. Alternatively, coating may be made reflective such as a wavelength-selective hologram. These are merely example coatings, as it will be clear to those of ordinary skill in the art having the benefit of this disclosure that other coatings may be used as well, depending upon application.

When used, for example, in an automotive application, the optical relay 650 may be capable of enabling a virtual display such that if a viewer looks through the optical relay 650 while an image is projected by the laser projection source (101) and scanner (102), at the direction of the control circuit (103), onto the optical relay 650, the image is viewable. In one embodiment, the projected image (108) appears to be located in front of the plane of the optical relay 650, whether it is flat or curved.

In automotive applications, the optical relay 650 may be embedded inside the windshield, laminated onto the windshield, or otherwise disposed between the viewer and the windshield, for example in a pull-down headliner, or extendible upwards from a dashboard, or another variant. Further, by utilizing an appropriate coating, the optical relay 650 may also be utilized to reduce or eliminate ghosting artifacts. In addition, optical relay 650 may be utilized to minimize or reduce scatter by use of various coatings on the Fresnel elements, or via a selected design of the tilt of the Fresnel elements and/or and Fresnel facet ring z-placement so as to limit light illuminating the Fresnel facet element sidewalls, which optionally may be selected to tradeoff with uniformity of the displayed image by reducing shadowing and/or gapping effects on the reflected light.

Figure 9:
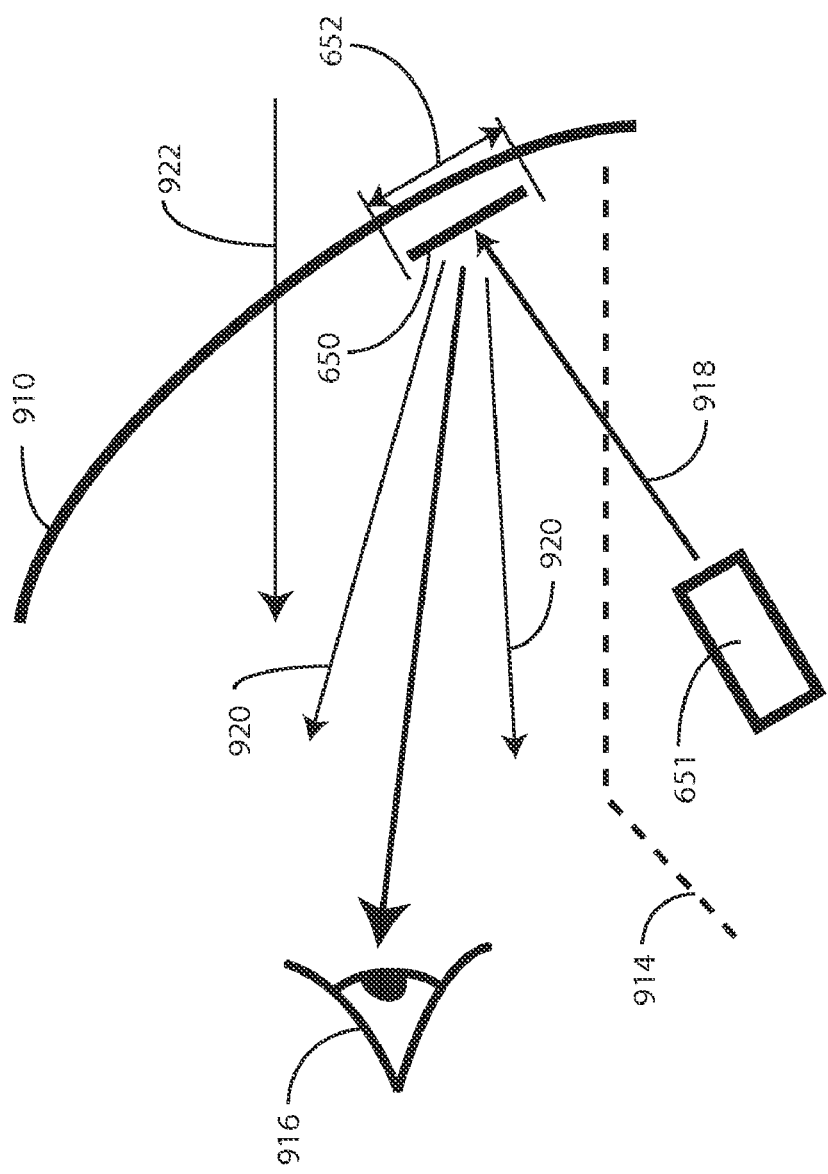
FIG. 9 illustrates one embodiment of a projection system in accordance with embodiments of the invention.

Referring now to FIG. 9, a diagram of the head-up display component that includes the optical relay 650 and image projection source 651 as originally shown in FIG. 6. The optical relay 650 may be disposed adjacent to, affixed on, or disposed in the sub-region 652 of a windshield 910, which serves as the projection surface (604). The optical relay 650 may be disposed within a dashboard 914 or similar enclosure of the vehicle. Alternatively, the optical relay 650 may be placed on or affixed to the exterior of dashboard, for example as an after-market deployment.

The image projection source 651, which may be any of light emitting diode light sources, liquid crystal display light sources, digital light processing light sources illuminated by lasers, or MEMS laser scanned light sources, projects an image on the optical relay 650 to be reflected as light rays 918 which are expanded by the optical relay 650 to project an image within a display output cone 920 to a viewer's eye 916. In addition, ambient light rays 922 may pass through the windshield 910 and the optical relay 650 so that the user may see through the optical relay 650 to allow unimpaired operation of the vehicle.

Figure 10:
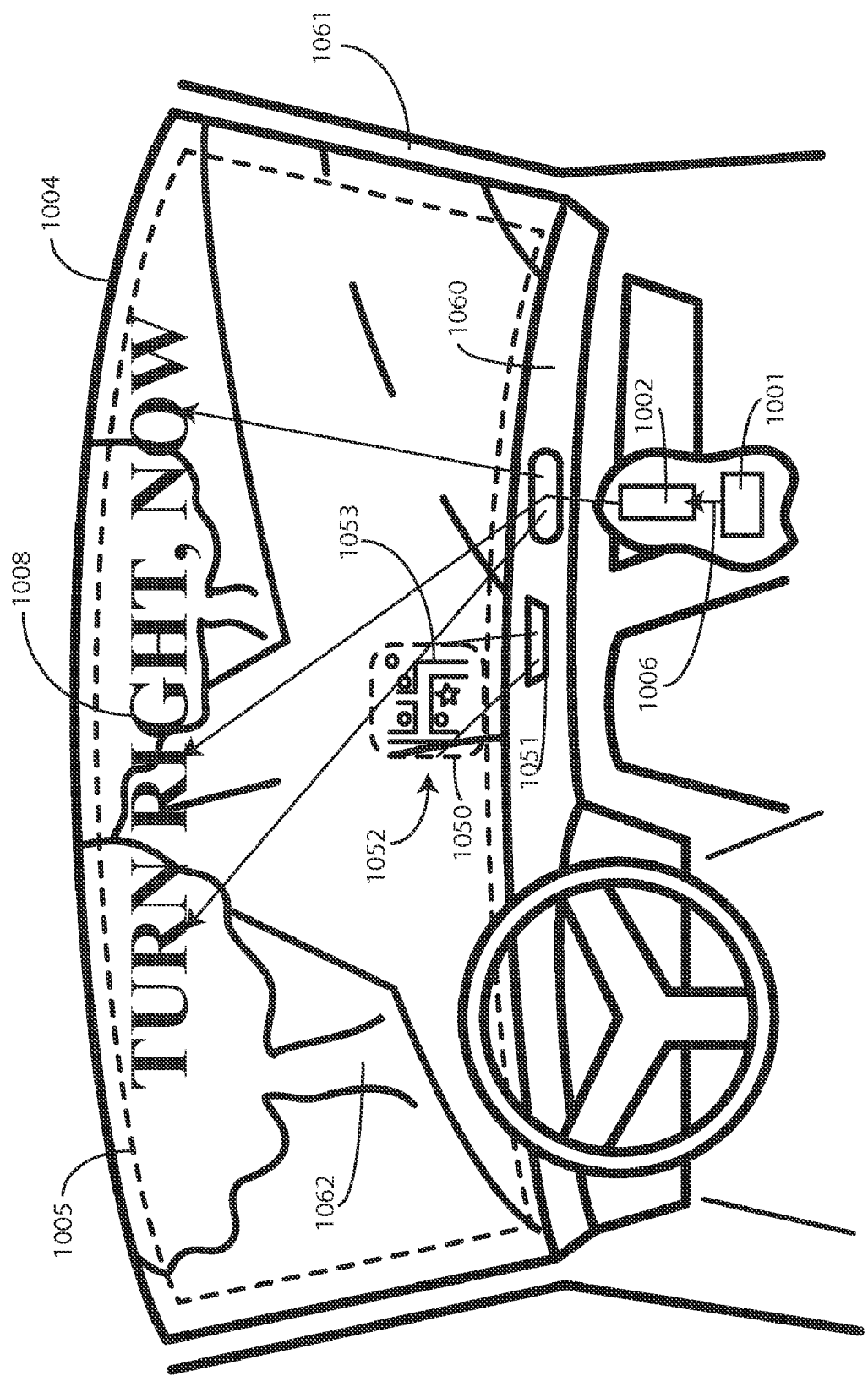
FIG. 10 illustrates one application for a projection system in accordance with embodiments of the invention.

Turning now to FIG. 10, illustrated therein is an automotive application for a projection system in accordance with embodiments of the invention. The application of FIG. 10 is that of a head-up display in an automobile. The application of FIG. 10 is intended to be illustrative only, as other applications are also suitable for embodiments of the invention, including near-to-eye displays and head-up displays in non-automotive applications.

In the illustrative embodiment of FIG. 10, a visible-light laser projection source 1001 delivers light 1006 to a two-axis vector scanner 1002. As shown in FIG. 10, both the visible-light laser projection source 1001 and the two-axis laser scanner 1002 are embedded in the dash board. This can be accomplished due to the wide scan angle delivered by the two-axis laser scanner 1002. Despite being located in very close proximity with the windshield 1004, which serves as the projection surface, the two-axis laser scanner 1002 can address substantially all of the windshield 1004, thereby giving the driver a broad field of view for a projected image presented on the windshield 1004.

In FIG. 10, the visible-light projection source 1001 and two-axis laser scanner 1002 have been integrated into the dashboard 1060. While this is one location, the visible light projection source 1001 or the visible light projection source 1001 and the two-axis laser scanner 1002 could be mounted to the roof or windshield side-bar 1061 as well. The visible-light projection source 1001 and two-axis laser scanner 1002 can be mounted together or separately.

The two-axis laser scanner 1002, which may be responsive to a control circuit, is configured to selectively deflect light along the windshield 1004 so as to form a projected image 1008. To be able to reflect the projected image, the windshield 1004 has embedded therein—or attached thereto—an aperture expander 1005. The aperture expander 1005, which has reflective and transmissive properties as previously described, permits a viewer to view the projected image 1008 on an otherwise translucent surface. In one embodiment, the projected image appears to the viewer to be in the plane of the windshield 1004.

As described above, in one embodiment the aperture expander 1005 includes an exit pupil expander. The aperture expander 1005 can also include a reflective layer disposed on exit pupil expander. Some of the light from the image projection source 1051 is at least partially reflected by the reflective layer, thereby creating an image viewable by the viewer. As the light is reflected, it can be expanded into a larger output numerical aperture. Further, some light impinging on the exit pupil expander is at least partially transmitted without substantial distortion through the reflective layer, thereby allowing the viewer to see objects through the windshield 1004.

The system then includes an image projection source 1051 that is configured to project a second image 1053 on a sub-portion 1052 of the windshield 1004. To be able to reflect the second image 1053, in one embodiment the sub-portion 1052 of the windshield 1004 includes an optical relay 1050 onto which the second image is projected. In one embodiment, the optical relay 1050 is configured such that the second image 1053 appears to be farther from the viewer than the windshield 1004. For example the second image 1053 might appear to be located above the front end of the car.

The optical relay 1050 can include a lens having a partially reflective coating and a first index of refraction. The lens can be any of a Fresnel lens, a diffractive lens, a holographic lens, or combinations thereof. The optical relay 1050 in one embodiment also includes a filler medium having a second index of refraction. The filler medium is disposed adjacent to the lens.

In the illustrative embodiment of FIG. 10, the projection system is serving as a navigation device. The projected image 1008 is step by step directions for the driver to get to a particular location. One step—TURN RIGHT—is shown in large, low resolution letters on the windshield 1004. Meanwhile, a detailed, high resolution map is displayed within the sub-portion 1052 of the windshield 1004 with the image projection source 1051. The driver is thereby able to read the large directions without being distracted from other objects 1062 on the road. When, for example, the driver stops the vehicle, he is then able to examine the high-resolution map shown in the sub-portion 1052 of the windshield 1004. Note that the sub-portion 1052 of the windshield 1004 may be made opaque to make high-resolution image viewing easier. Where this is the case, the sub-portion 1052 can be moved to a non-visually-impairing portion of the windshield 1004 so as not to block the driver's line of sight.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A system for providing a head-up display, comprising:
   a laser-projection source;
   a scanner configured to receive light from the laser-projection source and deliver scanned light to a projection surface as a projected image; and
   a control circuit coupled to the scanner and configured to control scanning of the light received from the laser-projection source to form the projected image;
   wherein the projection surface comprises an buried numerical aperture expander comprising:
      an exit pupil expander; and
      a reflective layer disposed on said exit pupil expander;
      wherein the exit pupil expander and the reflective layer are disposed within an envelope, the exit pupil expander and the envelope having substantially similar coefficients of refraction;
      wherein some of the light impinging on the exit pupil expander may be at least partially reflected by the reflective layer and expanded into a larger output numerical aperture, and some of the light impinging on the exit pupil expander is at least partially transmitted without substantial distortion through said reflective layer;

wherein the projection surface comprises an optical relay disposed along a sub-region of the projection surface, wherein the optical relay comprises:

a diffractive optical element having an at least partially reflective coating and having a first index of refraction; and a filler medium having a second index of refraction and being disposed adjacent to the diffractive optical element;

wherein the optical relay is at least partially transparent.

2. The system of claim 1, wherein the diffractive optical element further comprises:

a first layer and a second layer;

wherein the diffractive optical element and the filler medium are disposed between the first layer and the second layer.

3. The system of claim 1, wherein the diffractive optical element comprises a surface relief computer generated hologram, or a surface relief diffractive lens, or combinations thereof.

4. A system for providing a head-up display, comprising:

a laser-projection source;

a scanner configured to receive light from the laser-projection source and deliver scanned light to a projection surface as a projected image;

a control circuit coupled to the scanner and configured to control scanning of the light received from the laser-projection source to form the projected image;

wherein the projection surface comprises an buried numerical aperture expander comprising:

an exit pupil expander; and a reflective layer disposed on said exit pupil expander;

wherein the exit pupil expander and the reflective layer are disposed within an envelope, the exit pupil expander and the envelope having substantially similar coefficients of refraction;

wherein some of the light impinging on the exit pupil expander may be at least partially reflected by the reflective layer and expanded into a larger output numerical aperture, and some of the light impinging on the exit pupil expander is at least partially transmitted without substantial distortion through said reflective layer;

wherein the projection surface comprises an optical relay disposed along a sub-region of the projection surface; and an image projection source configured to project a second projected image along the sub-region of the projection surface.

5. The system of claim 4, wherein the control circuit is configured to cause the scanner to scan the light received from the laser-projection source along portions of the projection surface other than the sub-region of the projection surface.

6. The system of claim 5, wherein the buried numerical aperture expander is configured to reflect the projected image so as to appear viewable in a plane defined by the projection surface, wherein the optical relay is configured to reflect the second projected image so as to appear viewable in front of the plane defined by the projection surface.

7. A projection system, comprising:

a visible laser projection source;

a scanner configured to selectively deflect light received from the visible laser projection source along a projection surface so as to form a projected image;

the projection surface, wherein the projection surface comprises an aperture expander onto which the projected image is projected to allow a viewer to view the projected image on the aperture expander; and an image projection source configured to project a second image on a sub-portion of the projection surface, wherein the sub-portion of the projection surface comprises an optical relay onto which the second image is projected to allow the second image to appear to the viewer to be farther away than the projection surface.

8. The projection system of claim 7, wherein the optical relay comprises a lens having an partially-reflective coating and a first index of refraction, wherein the lens comprises a Fresnel lens, a diffractive lens, or a holographic lens, or combinations thereof, and a filler medium having a second index of refraction and being disposed adjacent to the lens.

* * * * *